F. A. DAILEY & B. LONG.
STORAGE CHAMBER STUFFING BOX.
APPLICATION FILED MAR. 31, 1909.
934,289.
Patented Sept. 14, 1909.
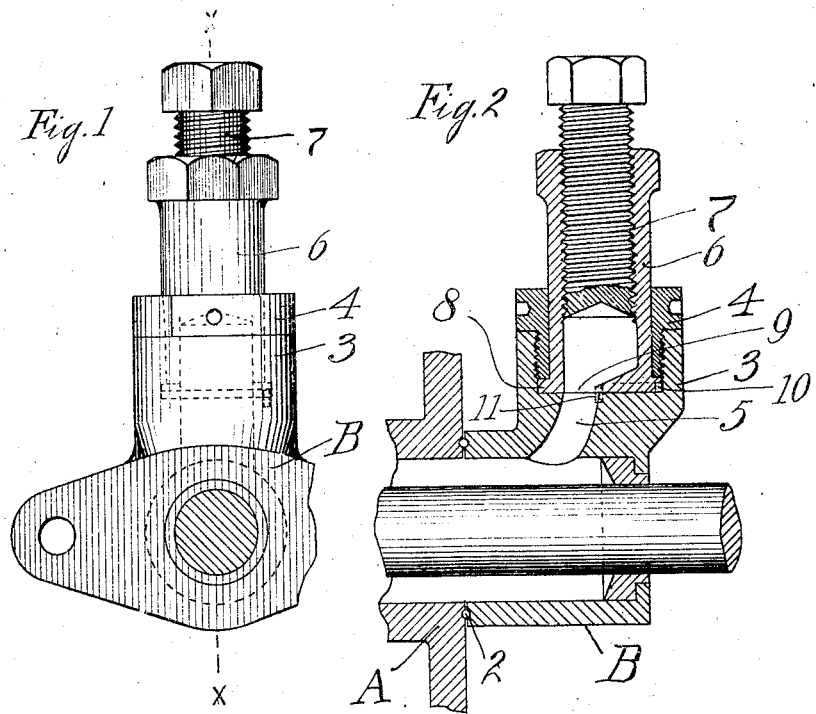
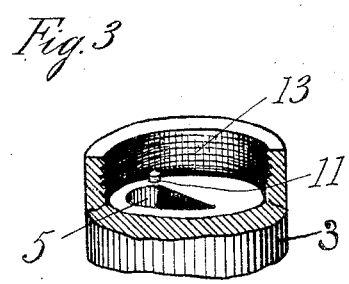
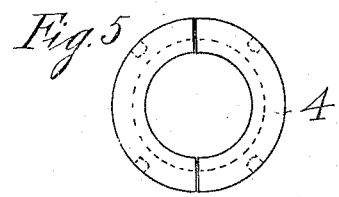
Witnesses,
George Voelker
J. Smith.
Inventors,
Fred A. Dailey
Barney Long
by Lothrop & Johnson
their Attorney

UNITED STATES PATENT OFFICE.

FRED A. DAILEY, OF ST. PAUL, AND BARNEY LONG, OF MINNEAPOLIS, MINNESOTA, ASSIGNORS TO PLUNGER PLASTIC PACKING COMPANY, OF ST. PAUL, MINNESOTA, A CORPORATION OF MINNESOTA.

STORAGE-CHAMBER STUFFING-BOX.

934,289.  Specification of Letters Patent. Patented Sept. 14, 1909.

Application filed March 31, 1909. Serial No. 486,882.

*To all whom it may concern:*

Be it known that we, FRED A. DAILEY and BARNEY LONG, citizens of the United States, residing at St. Paul, in the county of Ramsey and State of Minnesota, and Minneapolis, in the county of Hennepin and State of Minnesota, respectively, have invented certain new and useful Improvements in Storage-Chamber Stuffing-Boxes, of which the following is a specification.

Our invention relates to improvements in storage chamber stuffing boxes, and has for its object to provide a stuffing box having a communicating chamber for the storage and supply of packing of the general character disclosed in United States Letters Patent No. 884,318 issued to us on April 7, 1908, wherein the storage chamber can be shut off from communication with the stuffing box, when desired, so as to close it to the entry of steam from the stuffing box and thereby enable it to be conveniently refilled with packing without stopping the engine or shutting off the steam.

To that end the invention consists in the construction, combination and arrangement of parts herein shown and described.

In the accompanying drawings forming part of this specification, Figure 1 is an end view of a stuffing box, partly broken away, embodying the invention; Fig. 2 is a vertical longitudinal section through the same on line x—x of Fig. 1; Fig. 3 is a perspective detail of a fragment of the upper end of the boss upon the outer section of the stuffing box; Fig. 4 is a perspective view of a fragment of the storage chamber, and Fig. 5 is a plan view of the spanner nut about the storage chamber.

In the embodiment of the invention shown in the drawings, which is particularly applicable to a throttle rod stuffing box, the stuffing box is constructed in two sections, an inner or main section A which can be secured to the boiler head or cylinder head in any suitable way, and an outer section B removably secured against the main section in any convenient way, a tight joint being obtained by means of the copper gasket 2. The outer section of the stuffing box is provided with a lateral boss 3. This boss is formed with an annular socket 13 within which is rotatably supported the outwardly extending storage chamber 6. The storage chamber is formed at the bottom with an exterior annular flange 8, and is secured within the boss by means of an annular spanner nut 4, which has screw threaded engagement with the inner side wall of the socket and can be screwed down about the storage chamber above the flange 8, thus holding the chamber from longitudinal movement while at the same time permitting it to be rotated.

The boss is formed with an opening or port 5, preferably semicircular in cross section, leading from the socket 13 into the stuffing box proper, while the storage chamber is formed at the bottom with an outlet opening or port 9 which registers with the port 5 when the storage chamber is turned to the necessary extent. To stop the further rotation of the chamber when it has been turned to bring the port 9 into or out of registration with the port 5, a pin and groove connection is provided between the chamber and boss. As here shown, the chamber is formed in its bottom with a semicircular groove 10 around the closed portion thereof, while the boss is formed near one end of the port 5 with a pin 11 which works in the groove 10 and abuts against one of the end walls 12 thereof when the ports are in full registration, and against the opposite end wall when the ports are entirely shut off from registration.

The storage chamber is interiorly threaded to receive the screw ram or plunger 7 which works within it. The chamber is constructed to receive and hold a supply of plastic packing, which can be forced into the stuffing box from time to time, as required, by screwing down the ram 7. The ram is made, preferably, with an upwardly coned or concave bottom face in order the better to grasp the packing. To refill the storage chamber without stopping the engine, the chamber is first turned in the boss to carry the port 9 out of registration with the port 5, thereby closing communication between the chamber and stuffing box and shutting off the steam from the chamber. The ram is then removed, and a supply of packing inserted in the chamber. The ram is then replaced a screwed down and the chamber given a half turn to open the ports to each other, so that the packing can pass into the stuffing box.

We claim as our invention:

1. The combination, with a stuffing box, of a chamber supported thereon for the storage and supply of plastic packing, the chamber and stuffing box having communicating openings constructed to permit the passage of plastic packing from the storage chamber into the stuffing box, a screw ram adapted to be progressively advanced within the chamber and to exert positive and inelastic pressure upon the packing within the same, and means for closing communication between the chamber and stuffing box.

2. The combination, with a stuffing box having an inlet port, of a packing storage chamber movably supported upon the stuffing box and constructed and arranged to be moved into and out of communication with said port.

3. The combination, with a stuffing box having an inlet port, of a packing storage chamber rotatably supported upon the stuffing box and constructed and arranged to be turned into and out of communication with said port.

4. The combination, with a stuffing box, of a chamber supported thereon for the storage and supply of plastic packing, the chamber and stuffing box having communicating openings constructed to permit the passage of plastic packing from the storage chamber to the stuffing box, a ram having screw engagement with the inner side of the chamber wall, and adapted, when screwed down, to exert positive and unyielding pressure upon the packing within the chamber and force it into the stuffing box, and means for closing communication between the chamber and stuffing box.

5. The combination, with a stuffing box having an exterior socket, of a storage chamber rotatively supported in the socket, means holding the chamber from longitudinal movement in the socket while permitting rotative movement thereof, and a screw operated ram working within the chamber, the chamber and stuffing box wall having openings in position to be brought into and out of registration with each other as the chamber is turned.

6. The combination, with a stuffing box, of a chamber arranged in connection therewith for the storage and supply of plastic packing, the chamber and stuffing box having communicating openings constructed to permit the passage of packing in plastic condition from the storage chamber to the stuffing box, a screw ram adapted to be progressively advanced within the chamber so as to force the packing therefrom into the stuffing box and means for closing communication between the chamber and stuffing box.

In testimony whereof we affix our signatures in presence of two witnesses.

FRED A. DAILEY.
BARNEY LONG.

Witnesses:
ARTHUR P. LOTHROP,
H. SMITH.